No. 711,375. Patented Oct. 14, 1902.
A. BAUDRY.
PROCESS OF PURIFYING SUGAR JUICE BY MEANS OF ELECTRODIALYSIS.
(Application filed Feb. 28, 1899.)
(No Model.) 2 Sheets—Sheet 1.

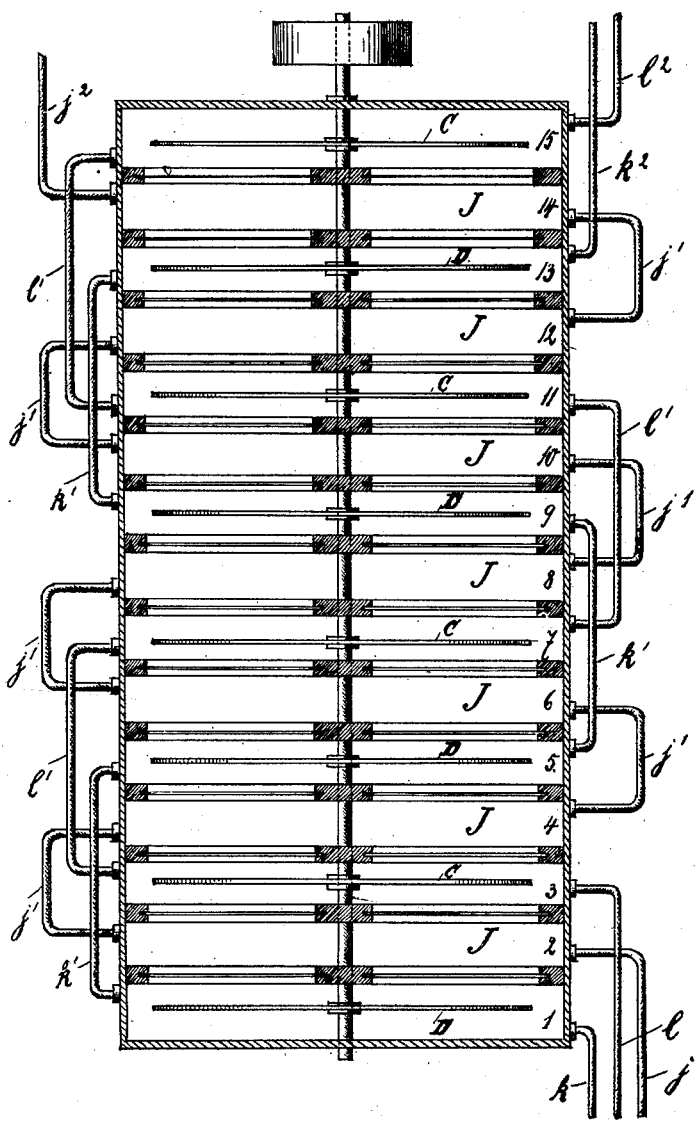

UNITED STATES PATENT OFFICE.

ALBERT BAUDRY, OF KIEW, RUSSIA.

PROCESS OF PURIFYING SUGAR-JUICE BY MEANS OF ELECTRODIALYSIS.

SPECIFICATION forming part of Letters Patent No. 711,375, dated October 14, 1902.

Application filed February 28, 1899. Serial No. 707,216. (No specimens.)

*To all whom it may concern:*

Be it known that I, ALBERT BAUDRY, chemist, a citizen of the French Republic, residing at Kiew, Russia, have invented a new and useful Process for the Purification of Sugar-Juice by Means of Electrodialysis; and I do hereby declare that the following is a full, clear, and exact description of the invention, such as will enable others skilled in the art to which it appertains to make and use the same, reference being had to the accompanying drawings.

The object of this invention is to provide a new and improved process for purifying the juice of beet-sugar.

To this end the invention consists in an electrodialytic treatment of the sulfurated sugar-juices whereby the sulfurous acid is converted in its free state or from its salts into hyposulfurous acid by the hydrogen formed during the electrodialysis. This hyposulfurous acid eventually produces the chief clarifying action.

In order to carry my invention into practice, I make use of an apparatus one of the preferred forms of which I have illustrated in the accompanying drawings, wherein—

Figure 1:
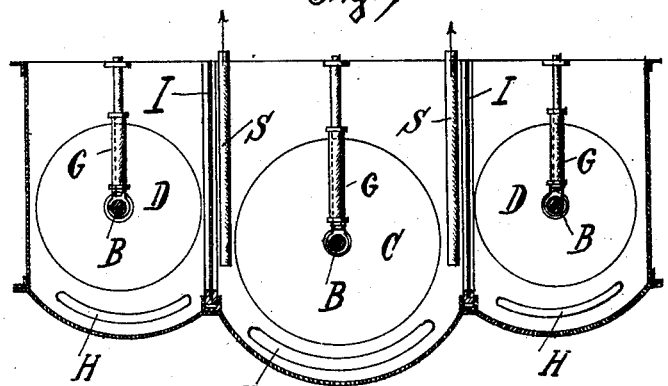
Figure 2:
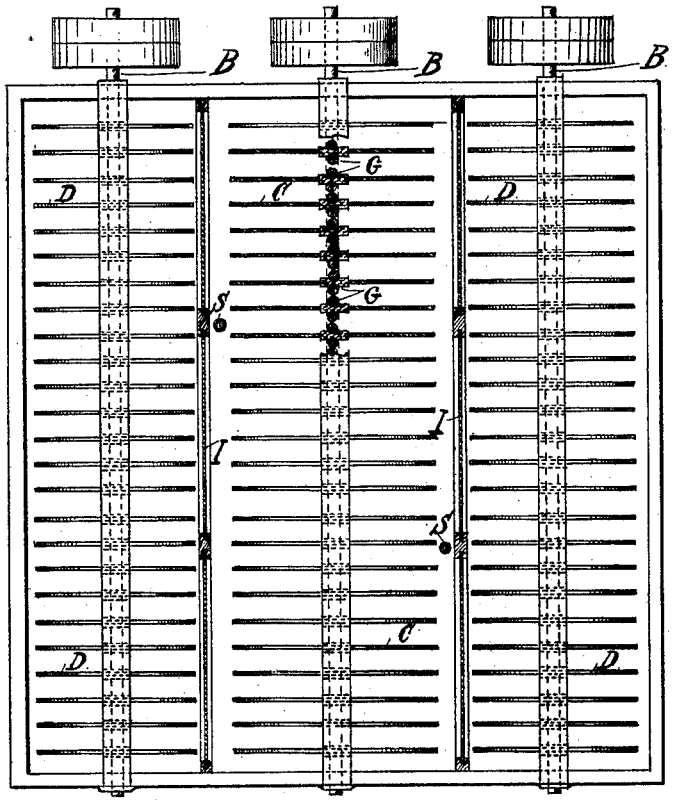

Figure 1 is a vertical sectional view of an electrolytic apparatus employed in the initial treatment; Fig. 2, a top plan view of the same. Fig. 3 is a vertical section through the apparatus in which the final electrolytic treatment is given.

I first electrolyze the thin sugar-juice in positive compartments, (the negative compartment containing water at this time,) having previously neutralized the same by means of sulfurous acid, so that the bases usually contained in the juice are converted into neutral sulfite of potassium or sodium. I then proceed to treat the same in negative compartments, here also saturating the juice (which is now saturated) with sulfurous acid. In this manner the electropositive impurities (the bases) are first removed and afterward the electronegative impurities, (the acids,) resulting in a most easy-flowing colorless syrup on account of the combination of the sulfurous acid in its bases and the free sulfurous acid with the hydrogen, (H,) which is liberated at the cathode into hyposulfurous acid, ($SO_2H_2$,) possessing a very great power of decolorization and at the temperature at which the electrolysis is carried on absolutely excluding all danger of inversion of the sugar. The sugar-juice is first saturated with sulfurous acid ($SO_2$) until neutralized in order to precipitate any lime which may be present therein and to convert the salts of potassium and sodium into neutral sulfites, the latter being present in all sugar-juices. The clear sugar-juice is after filtration run into the anode-compartment of the electrolytic vessel shown in Fig. 2, which is divided by filtering partition-walls into three unequal compartments. These partition-walls consist of wooden frames, into which parchment-paper I is inserted, or partitions may be used which are packed with any material which will permit of the passage of the liquid and does not offer too great a resistance to the passage of the electric current. Each of these three compartments contains electrodes D C D of round or other suitable form mounted upon a slowly-revolving shaft B. In order to keep them in clean condition and to prevent polarization, the electrodes are turned between rollers G, of rubber or similar material, as described in Swiss Patent No. 2,039. The middle compartment being the largest, receives the sugar-juice and contains the anodes C. The two compartments at either side thereof are filled with water and contain the cathodes D.

The anodes C are formed of so-called "soluble" metals—for instance, zinc, aluminium, lead, tin, iron, nickel, &c., either pure or alloyed with each other—while for the cathodes D D metals must be used which are not attacked by the freed alkalies, such as nickel, iron, tin, copper, or the like.

To reduce the loss of electric energy resulting from the resistance of the electrolyte, the sugar-juice and the water are drained off at a high temperature, and to maintain this temperature or eventually raise the same a series of copper pipes H, tinned on the outside, are arranged on the bottom of each compartment, through which steam may be supplied. The sugar-juice is then filtered and allowed to evaporate. The juice after being concentrated into syrup is treated with lime or baryta until the alkalinity amounts to about 0.1 per cent. and then neutralized with sulfurous acid. The resulting deposit of sulfite of lime or baryta serves to collect the impurities precipitated during evaporation and to facilitate their filtration, whereby during the second treatment with a larger addition of sulfurous acid these impurities are not redissolved. The filtered, clear, and neutral syrup, whose temperature must not exceed 40° to 50° centigrade, (104° to 122° Fahrenheit,) flows now into the middle compartment of a second vessel (not shown) of like construction to that depicted in Figs. 1 and 2 to be subjected here to the action of the negative electrodes. Before entering this apparatus the syrup receives it first injection of sulfurous acid, then a second in the vessel, so that its acidity amounts to 0.05 to 0.30 per cent., according to the desired degree of decolorization and the duration of the electrolytic treatment.

The negative compartment is provided with a leaden pipe for the introduction of the sulfurous acid. The sulfurous acid decomposes all organic substances which are not sugar, whereby the organic acids are freed, changing into hyposulfurous acid ($SO_2H_2$) by combining with the hydrogen, which is set free at the cathode and forms thus a new body possessing a very great power of decolorization and excluding all danger of inversion. At about the middle of the electrolytic treatment the temperature is raised to 70° or 80° centigrade (158° or 176° Fahrenheit) in order to decompose the hyposulfurous acid and to diminish the resistance of the electrolytes, (syrups and water.) The organic acids and the sulfurous acid, as also the derivatives, pass then into the side compartments containing the water and the anodes. Thus a very pure, easy-flowing, and almost entirely decolorized syrup is obtained, and this energetic treatment is also very well adapted for general application upon all sugar-juices containing impurities which can be converted into acid products.

It is desirable in some cases to remove as far as possible the minor impurities still present in the syrup. To this end the sugar-juice is subjected a second time to an electrolytic treatment. For this purpose I preferably employ an apparatus of the form shown in Fig. 3. This apparatus may be of any preferred construction, but in the present instance has the general form of a cylinder divided transversely by partition-walls J into compartments 1 to 15, as shown. A central shaft traverses said cylinder vertically and carries in each alternate compartment disks C or D, serving as electrodes—that is to say, compartments 1 5 9 13 carry the anodes C and compartments 3 7 11 15 carry the cathodes D. In practice said electrodes are arranged to rotate between brushes or the like in order to keep them clean. This provision is not illustrated; but it is obvious to the artisan that practically any of the well-known constructions of this kind would answer the purpose, and their operation is apparent. The sugar enters compartment 2 through pipe $j$, from whence it passes in turn via pipes $j'$ to compartments 4 6 8 10 12 14, being subjected during its passage through the apparatus to the simultaneous action of the cathodes on one side and the anodes on the other. The alternate compartments, or those containing the electrodes, are supplied with water through the medium of pipes $k$ $l$ $k'$ $l'$.

Having thus described my invention, what I claim as new, and desire to secure by Letters Patent of the United States, is—

1. A process for clarifying and purifying sugar-juice, which consists in neutralizing the juice by an addition of sulfurous acid; filtering, and electrolyzing the juice by subjecting it successively to the action of the electric current at the anodes and cathodes, whereby the sulfurous acid combines with the hydrogen liberated at the cathode to form hyposulfurous acid, which exerts a clarifying action on the juice; decomposing the hyposulfurous acid and thereafter electrolyzing the concentrated syrup, during which treatment the syrup is subjected to the simultaneous action of the electric current at the anodes and cathodes, substantially as specified.

2. A process for clarifying and purifying sugar-juice, which consists in neutralizing the juice by an addition of sulfurous acid; filtering, and electrolyzing the juice and subjecting the same to the action of the electric current at the positive electrode to remove all electropositive impurities; refiltering the juice and evaporating the same; adding an alkali to the resulting syrup and neutralizing the same with sulfurous acid at a temperature of about 40° to 50° centigrade; thereafter subjecting the syrup to the action of the electric current at the negative electrode, whereby the hydrogen liberated combines with the sulfurous acid to form hyposulfurous acid, which serves to decolor the syrup; and finally subjecting the syrup to the simultaneous action of the electric current at both electrodes, substantially as specified.

3. A process for clarifying and purifying sugar-juice, which consists in neutralizing the juice by an addition of sulfurous acid; filtering, and electrolyzing the juice by passing the same through a series of positive compartments; refiltering, and evaporating the same; adding an alkali to the resulting syrup and neutralizing the same with sulfurous acid at a temperature of about 40° to 50° centigrade; passing the syrup through a series of negative compartments and finally subjecting the syrup to the simultaneous action of the electric current at both electrodes.

4. A process for clarifying and purifying sugar-juice, which consists in neutralizing the juice by an addition of sulfurous acid; filtering, and electrolyzing the syrup by subjecting the same to the action of the electric current at soluble positive electrodes immersed in an electrolyte composed of water and syrup; refiltering, and evaporating the juice; adding an alkali to the resulting syrup and neutralizing the same with sulfurous acid at a temperature of about 40° to 50° centigrade; thereafter subjecting the syrup to the action of the electric current at the negative electrodes; and again electrolyzing the syrup to remove all minor impurities still present therein, during which treatment the syrup is under the simultaneous action of the electric current at both electrodes, substantially as described.

5. A process for clarifying and purifying sugar-juice, which consists in neutralizing the juice by an addition of sulfurous acid; filtering, and electrolyzing the juice by subjecting the same to the action of the electric current at soluble positive electrodes immersed in an electrolyte of syrup and water, separated from the juice by a porous conducting medium; refiltering, and evaporating the juice; adding an alkali to the resulting syrup and neutralizing the same with sulfurous acid at a temperature of about 40° to 50° centigrade; thereafter subjecting the syrup to the action of the electric current at negative electrodes, whereby the hydrogen liberated combines with the sulfurous acid to form hyposulfurous acid, as described; and again electrolyzing the syrup to remove all minor impurities still present therein, during which treatment the syrup is under the simultaneous action of the electric current at both electrodes, substantially as specified.

In witness whereof I have hereunto set my hand in presence of two witnesses.

ALBERT BAUDRY. [L. S.]

Witnesses:
E. FR. GODISEY,
KARST BOGDAN.